US005601683A

United States Patent [19]

Martin

[11] Patent Number: 5,601,683

[45] Date of Patent: Feb. 11, 1997

[54] PHOTOCOPY RESISTANT DOCUMENT AND METHOD OF MAKING SAME

[75] Inventor: J. Philip Martin, San Antonio, Tex.

[73] Assignee: Clarke American Checks, Inc., San Antonio, Tex.

[21] Appl. No.: 591,030

[22] Filed: Jan. 25, 1996

Related U.S. Application Data

[62] Division of Ser. No. 254,352, Jun. 6, 1994, Pat. No. 5,510,199.

[51] Int. Cl.$^6$ .......... B32B 31/00

[52] U.S. Cl. .......... 156/277; 283/72; 283/92; 428/690; 428/915; 428/916

[58] Field of Search .......... 156/389, 390, 156/277; 427/146, 201; 428/195, 207, 913, 914, 690, 915, 916

[56] References Cited

U.S. PATENT DOCUMENTS

| | | | |
|---|---|---|---|
| 4,066,280 | 1/1978 | La Capria | 283/902 |
| 4,522,429 | 6/1985 | Gardner et al. | 283/92 |
| 4,582,346 | 4/1986 | Caprio et al. | 283/94 |
| 4,588,212 | 5/1986 | Castagnoli | 283/89 |
| 4,884,828 | 12/1989 | Burnham et al. | 283/91 |
| 5,018,767 | 5/1991 | Wicker | 283/902 |
| 5,193,853 | 3/1993 | Wicker | 283/902 |
| 5,271,645 | 12/1993 | Wicker | 283/902 |

*Primary Examiner*—William Krynski
*Attorney, Agent, or Firm*—Cox & Smith Incorporated

[57] ABSTRACT

A photocopy-resistant document which has a background pattern or logo which is printed with solvent-sensitive, dye based ink and a method of making such a document. The presence of this photocopy-resistant background pattern or logo makes it impossible for a would-be forger of a face-value note such as a bank check to duplicate the original document as a color photocopy. It also makes it impossible for a printing plate to be made based on a photocopy of the document. Besides being photocopy-resistant, the indicia printed with the solvent-sensitive ink are washed away when acetone or bleach solvent is applied to the surface of the document. A fluorescence material can also be added to the solvent-sensitive ink to make the indicia printed with the ink fluorescent under black light.

6 Claims, No Drawings

PHOTOCOPY RESISTANT DOCUMENT AND METHOD OF MAKING SAME

This is a divisional of application Ser. No. 08/254,352, filed Jun. 6, 1994, now U.S. Pat. No. 5,510,199.

FIELD OF THE INVENTION

This invention relates to documents which are resistant to photocopying and to methods of making such documents.

BACKGROUND OF THE INVENTION

Modern photocopiers, especially color photocopiers, have greatly improved the ability of counterfeiters to accurately copy valuable documents such as checks, notes, bonds, etc.

Over the years various methods have been developed to make such documents resistant to photocopying. Such methods usually revolve either a special ink composition; a particular printed pattern; or minute gradations in the thickness of the printed image, or some combination of these methods, all of which result in making the document either wholly or partially resistant to photocopying.

Gardner et al. (U.S. Pat. No. 4,522,429) teaches the use of a combination of known specific colors of ink to achieve a printed image which has a reflection spectral response of less than about 10% for light with a wavelength below about 600–650 millimicrons. Thus the printed image is within the visible range of the eye but cannot be photocopied because it does not reflect in the range of light used in a photocopier, which is below about 600–610 millimicrons. This invention has the disadvantage of having a very narrow window where the pigment is both reflective and visible to the eye. Therefore, the printed matter on the document is quite light, making this technique impracticable for use with face-value documents such as checks, notes, bonds, etc.

La Capria (U.S. Pat. No. 4,066,280) teaches imprinting a document with two kinds of ink which overlap each other on the document. Most of the document is imprinted with conventional ink which is light absorptive. Overlapping or being overlapped by this conventional ink is a second imprint on the document which is of a specularly reflective coloring ink containing aluminum powder. This second imprint is a multiplicity of dots or lines which are difficult to reproduce by hand. This invention has several disadvantages, mostly as a result of the presence of the aluminum powder. No matter how fine the aluminum powder is it tends to accumulate in the fountains of printing presses. Furthermore, the reflective qualities of the aluminum powder can be significantly diminished as the document becomes soiled through normal usage. Furthermore, since the portion of the document printed with the reflective ink has a special pattern, it requires redesigning documents to incorporate such a special pattern.

Wicker (U.S. Pat. No. 5,271,645) teaches imprinting documents with ink which is a mixture of conventional ink material (pigments, dyes, etc.) as well as fluorescence compounds which are at a certain threshold level so that when the mixture is exposed to ultraviolet light the fluorescence is barely discernible to the eye. When a document imprinted with such a mixture is color photocopied, there is a significant diminution of color and overall quality. This invention has the disadvantage of requiting a very specific mixture of ink which has the potential to be difficult to replicate consistently in order to achieve the desired photocopy-resistant qualities.

Castagnoli (U.S. Pat. No. 4,588,212) teaches the imprinting of a safety design on a valuable document such as a bank note. This design is achieved by having juxtaposed groups of segments of parallel raised lines having two different heights, forming high and low reliefs, extending by turns in two predetermined different directions whereby the segments of one group are not parallel to those of an adjacent group. A first transitory image is formed by the high raised segments parallel to the first direction. A second transitory image is formed by the high raised segments parallel to the second direction. Such images cannot be photographed or photocopied but can only be visualized by the eye when the printed image is viewed from a certain angle. This invention has the disadvantage of being expensive to produce. Furthermore, it is only appropriate for documents which use very concentrated, ornate printing indicia, such as intaglio printing used with paper money. It is therefore not practical to use it for bank checks and other documents which need to be produced more inexpensively with less dense printing on the document.

Burnham et al. (U.S. Pat. No. 4,884,828) teaches an improvement on the moiré pattern conventionally used to provide security against counterfeiting in valuable documents. The moiré pattern generally uses interference fringes arising from two sets of generally parallel lines. The line sets are superimposed upon one another with their lines intersecting and mutually inclined at a small angle. With the use of high quality photocopiers, especially color copiers, the moiré pattern is no longer an effective anti-counterfeiting device. Bunham's improvement relates to a pattern formed of first and second sets of intersecting lines arranged to form one or more moiré effect interference fringes by having at least one of the line sets vary progressively in both line thickness and line spacing along their length. The photocopy-resistant function of this invention is improved when each line set is printed in a different color of ink. As a further improvement to the invention, the inks used can be inks which are known to have other anti-fraud characteristics such as solvent-sensitive inks, water-fugitive inks or UV-fluorescent inks which are invisible in daylight or normal artificial light. The disadvantages of the Bunham method are similar to the disadvantages with Castagnoli as well as LaCapria. First of all, moiré patterns are best used in documents, such as bank notes which are printed with very dense indicia. They are not practical for use with bank checks. Furthermore, the use of this pattern involves redesigning the document to incorporate the moiré patterns necessary to produce the photocopy-resistant effect.

Caprio et al. (U.S. Pat. No. 4,582,346) teaches a document substrate with background printed matter on a first portion of the surface of the substrate and a warning printed matter on a second portion of the surface of the substrate. The warning printed matter is not easily visible to the eye but when the document is photocopied, the warning printed matter is easily visible because of photocopier directional slur. This invention has many of the same disadvantages discussed above. It necessarily involves a densely concentrated printed indicia on the document in order to be able to produce the necessary effect of being invisible on the original document and visible in a photocopy. This also involves the necessity of redesigning any previously used documents in order to be able to incorporate the warning printed matter into the document Wicker (U.S. Pat. Nos. 5,018,767 and 5,193,853) teaches an invention in which documents are imprinted with lines formed into various patterns imitative of intaglio or gravure printing. The pitch of the lines is deliberately selected so as to vary minutely from the pitch of the scanning trace of various copying machines. The variation in pitch may be obtained by deliberately manufacturing the document with the desired pitch or, subsequent to the image placement therein, altering the dimensions or geometry of the document so as to effectively skew the pitch parameter, by heating the printing matte to subtly alter the imprinted pattern. As with several of the other inventions discussed above, because this method involves specifically designing an imprinted indicia on a document to have a desired pitch, this method necessarily involves redesigning a previously used document. Furthermore, because this method requires the use of intricate patterns, such as patterns which imitate the gravure or intaglio printing methods, it is somewhat restricted in the type of printed indicia which can be used. It is also likely that an imprinted pattern which is photocopy resistant on one type of photocopier will not be photocopy resistant on another type of photocopier.

The present invention overcomes the problems and disadvantages of the above-discussed patents. It does not involve the necessity of using intricate styles of printing and thus can be adapted to be used with preexisting printing designs. The ink used in printing the photocopy-resistant indicia of the present invention is easy to produce and obtain and is identifiable by specific colors specifically identified by the trademark "Pantone Matching System" numbers. (Pantone Matching System is a trademark of Pantone, Inc.) It does not involve the use of metallic powders or other additives in the ink which have a tendency to accumulate in printing fonts. Nor does it rely on specular qualities in the ink which have a tendency to be diminished over time as the document becomes soiled and faded.

SUMMARY OF THE INVENTION

The, present invention relates to a document which is not accurately copyable by a photocopier comprising a substrate which is a matte onto which indicia are printed; and indicia comprising a coating mixture including at least one dye means in a resin-based carrier means, said coating mixture containing no pigment means.

In one embodiment of the present invention the dye means in the coating mixture of the printed indicia can be removed from the document by applying an ink-eradicating type chemical, such as acetone or bleach, to the document surface.

In one embodiment of the present invention, the printed indicia is printed at a screen density of from 2 to 10% with a software-based print format deriving a printed image from an algorithm stored in a software computer program.

In another embodiment of the present invention, the printed indicia is printed with a continuous tone (CT) font with an image of from 300 to 1200 dots per inch at a screen density of from 15 to 23%.

In yet another embodiment of the present invention, the coating mixture also comprises a fluorescence printing means which causes the printed indicia to fluoresce under ultra-violet light.

In, still another embodiment of the present invention, the coating mixture has a color density selected from the group consisting of gray specifically identified by trademark "Pantone Matching System" number 428, gray specifically identified by trademark "Pantone Matching System" number 426 and bluish gray specifically identified by trademark "Pantone Matching System" number 282.

In an additional embodiment of the present invention, the resin-based carrier means comprises a soya-based resin.

In a further embodiment of the present invention, the photocopier is a color photocopier.

The present invention also relates to methods of making the above-described photocopy-resistant document and its various embodiments. The methods generally comprise the steps of preparing a mixture comprising a dye means and a resin-based carrier means; and printing the mixture onto a substrate so that, upon the drying of the mixture, the indicia appears on the document.

Various other objects and advantages of the present invention will become apparent from the following detailed description of the invention.

DETAILED DESCRIPTION OF THE INVENTION

In an effort to find ways to prevent face-value documents such as bank checks, bank notes etc. from being forged, it is necessary to prevent the accurate photocopying, especially color photocopying, of such documents. Otherwise, if a potential forger can obtain a clear color photocopy of such a document, he can either use the copy itself as a counterfeit or he can use the photocopy to make a printing plate by which counterfeits can be printed on paper very similar to the original document to make even more accurate counterfeits.

A person who steals bank checks often obtains a check after it has been filled out and signed by the issuer of the check. In order to make an accurate photocopy of the check, or for that matter to alter any of the handwritten information such as the amount or the name, it is necessary to first remove the handwritten portions which are usually written in ink from a ball-point pen, fountain pen or felt tip pen. The ink from such pens can often be removed quite effectively by wiping the handwritten portions of the check with an ink-eradicating type chemical such as chlorine bleach or acetone. Such solvents remove the ball-point pen ink but leave intact the printed ink of the original check.

The ink which is conventionally used to print checks is pigment-based ink. These pigments are colored particles of solid, metallic material which are suspended in a colorless, resin-based vehicle. When the ink is printed on paper and dries, the pigments become ionically bound to the molecular structure of the paper. When an ink-eradicating type chemical, such as acetone or bleach, are applied to the pigment-based ink, even though the resin-based vehicle is dissolved by the solvent, the ionic bonds between the pigment particles and the paper are not broken, so the pigment particles and the color associated with them remains. In contrast, in a dye-based ink such as would be found in a conventional ball-point pen, fountain pen or felt-tip pen, the dye exists as molecules which completely dissolve in the resin-based vehicle. Thus, each individual dye molecule is thoroughly surrounded by solvent molecules which bond weakly to the dye molecule by ion-dipole bonds. Thus the dye does not bind to the surface of the paper as pigments do. When an ink-eradicating type chemicals such as bleach or acetone dissolves the resin-based vehicle, the dye molecules dissolved in the resin are also dissolved with it. Thus the dye-based ink can be removed from the paper.

Dye-based inks somewhat similar in composition to the dye-based inks found in ball-point pens, fountain pens and felt-tip pens have been developed for use in printing face-value documents such as bank checks. Such inks are known as solvent-sensitive inks and are sometimes referred to as "fugitive" inks. For the reasons discussed above, such "fugitive" inks are useful for printing the background indicia and logos on bank checks. When a would-be forger attempts to wash off the hand-written portion of the check with a conventional ink-eradicating type chemical, such as acetone or bleach, the printed background of the check which is underneath the handwritten portion is removed as well.

The inventor of the present invention has found that certain specific ink densities of these "fugitive" inks are not only solvent-sensitive but are resistant to color photocopying when they are printed within a certain screen density range. Specifically, the inventor has found that indicia printed with "fugitive" ink having the following ink density: gray specifically identified by trademark "Pantone Matching System" number 428, gray specifically identified by trademark "Pantone Matching System" number 426 and bluish gray specifically identified by trademark "Pantone Matching System" number 282 is photocopy-resistant when printed in certain screen density ranges. These photocopy resistant qualities were found to be present when the printed indicia is printed with a software-based print format, in which the print format is derived from an algorithm stored on a computer software program, such as software sold under the trademark "Post-Script™" (Post-Script™ is a trademark of Adobe Systems, Inc.), at a screen density of from 2 to 10%. These photocopy resistant qualities were also found to be present when the printed indicia is printed with a CT font with an image of from 300 to 1200 dots per inch at a screen density of from 15 to 23%. These photocopy-resistant qualities can be achieved with various types and brands of high quality color photocopiers, including Canon 500™, Canon 550™ and Canon CJ10™.

The present inventor has also found that when fluorescence substances were added to the "fugitive" ink compositions described above, that the photocopy-resistant and solvent-sensitive qualities of the printed indicia were maintained while having the additional desirable anti-fraud characteristic of fluorescing under black light. This fluorescing characteristic is useful to distinguish the areas of a document that are printed with the "fugitive" ink from pigment-based ink. It is also useful to ascertain that the "fugitive" ink has not been altered or removed.

The fluorescence substances which can be added to the "fugitive" ink compositions to achieve this effect are selected from the group consisting of chlorophyll a (Chl a); bacteriochlorophyll a and b (Bchl a and b); Chl-650; Chl-660; the Alcphycocyanins and Phycocyanins; barium silicate-black; cadmium borate-pink; calcium halophosphate-white; calcium silicate-orange; calcium tungstate-blue; strontium halophosphate-cyan and zinc silicate-green.

EXAMPLES

The present invention will be illustrated in detail in the following examples. These examples are included for illustrative purposes and should not be considered to limit the present invention.

Example 1

"Fugitive" ink (i.e. ink which is dye-based and solvent sensitive) of various screen tint densities and PMS color densities was used to print background indicia, such as would be printed on the back of a conventional bank check. The background indicia formed a consistent pattern over the surface of the check. These background indicia were of a small print type with a name of a bank printed horizontally over and over again to form a consistent pattern. The background indicia was printed with a continuous tone (CT) font and was printed lightly enough so that text could be printed with darker, pigment-based ink over the background indicia and the pattern formed by the background indicia would not interfere with the legibility of the text of the check. The checks used in this example and the examples below had no printed text and so are referred to as "textless checks".

Several color photocopies were made of each of the textless checks using at least one of several color photocopiers including Canon 500™, Canon 550™ and Canon CJ10™. The photocopiers were adjusted to obtain the sharpest, dearest copy of the background indicia. When a color photocopy of a textless check printed with a background indicia having a particular screen tint and color density was found to be faded or when no image of the background indicia could be visualized at all, various methods were used to try to enhance the image quality of the photocopy of the background indicia. Besides adjusting the photocopier itself, two other methods were used, including photocopying the textless check against a dark background by placing a piece of black paper underneath the check as it was being photocopied and photocopying the check while a piece of acetate film covered the lens of the photocopier.

The photocopies of the various textless checks having different screen densities and ink densities were compared. It was found that the checks printed with background indicia having the following ink densities: gray specifically identified by trademark "Pantone Matching System" number 428, gray specifically identified by trademark "Pantone Matching System" number 426 and bluish gray specifically identified by trademark "Pantone Matching System" number 282 were resistant to color photocopying in comparison to other color densities tested, with the photocopied image obtained being either very faded and washed out or producing no image at all.

Furthermore, it was found that such ink densities were the most color photocopy-resistant when the CT font was printed with an image of from 300 to 1200 dots per inch and at a screen density of from 15 to 23%.

Example 2

The same procedures described in Example 1 were used to test the photocopy-resistance of the printed background indicia of textless checks. The background indicia of these textless checks contained a large print type logo in which the initials of a bank was printed once in large block letters covering virtually all of the middle third of the check. This large-print logo was printed with a format from software sold under the trademark Post-Script™ which prints an image according to a mathematical algorithm stored within the printer memory. As with the small print type background indicia, the logo was printed lightly enough so that the text could be printed over it in darker, pigment-based ink and the logo would not interfere with the legibility of the text of the check.

It was found that the large print logo printed in "fugitive" ink was color photocopy-resistant when, as with the small print background indicia, the color densities gray specifically identified by trademark "Pantone Matching System" number 428, gray specifically identified by trademark "Pantone Matching System" number 426 and bluish gray specifically identified by trademark "Pantone Matching System" number 282 were used. The photocopied images obtained were either very faded or washed out or produced no image at all.

It was furthermore found that the photocopy of the large print logo printed in the format from software sold under the trademark Post-Script™ was most color photocopy-resistant when the screen density of the printed image was from 2 to 10%.

Example 3

When a small amount of acetone was applied to a defined area on the surface of several of the textless checks which were found to be color photocopy-resistant in Example 2 above, both the small print background indicia and the large print logo in the area where the acetone was applied were washed away. The same effect was achieved when chlorine bleach was applied to a different defined area on the same textless checks.

Example 4

Several textless checks were printed with "fugitive" ink having the color densities gray specifically identified by trademark "Pantone Matching System" number 428, gray specifically identified by trademark "Pantone Matching System" 426 and bluish gray specifically identified by trademark "Pantone Matching System" number 282. The checks were each printed with small print background indicia in CT font with an image of from 300 to 1200 dots per inch and at a screen density of from 15 to 23% and/or the large print logo printed in the format from software sold under the trademark Post-Script™ with a screen density of from 2 to 10%. The "fugitive" ink used to print these checks also contained a small amount of a fluorescence substance in an amount sufficient to make the printed indicia fluorescent under a black light.

It was found that these textless checks having small print background indicia and/or a large print logo printed with the fluorescent "fugitive" ink had the same photocopy-resistant qualities as the textless checks which were printed with the non-fluorescent "fugitive" ink as in Examples 1 and 2.

While the foregoing invention has been described in some detail for purposes of clarity and understanding, it will be clear to one skilled in the art from the reading of this disclosure that various changes in form and detail can be made without departing from the true scope of the invention.

I claim:

1. A method of making a document consisting essentially of a substrate having a matte surface, a photocopy-resistant, non-fluorescent, background indicia and a non-photocopy-resistant, non-fluorescent textual indicia printed on the matte surface of the substrate comprising the steps of:

preparing a mixture consisting essentially of a solvent-eradicable dye and a resin-based carrier;

printing the mixture onto the matte surface of the substrate so that upon drying, the mixture the photocopy-resistant, non-fluorescent, background indicia is obtained, the color of the photocopy-resistant, background indicia being selected from the group consisting of gray specifically identified by trademark "Pantone Matching System" number 428, gray specifically identified by trademark "Pantone Matching System" number 426 and bluish gray specifically identified by trademark "Pantone Matching System" number 282;

preparing an ink consisting essentially of resin-based carrier and non-solvent-eradicable, pigment particles; and printing the ink onto the matte surface of the substrate over the photocopy-resistant, non-fluorescent, background indicia so that upon drying, the ink the non-photocopy-resistant, non-fluorescent textual indicia is obtained.

2. The method of claim 1, wherein the solvent-eradicable dye in the photocopy-resistant, non-fluorescent background indicia is eradicable with a solvent selected from the group consisting of acetone and chlorine bleach.

3. The method of claim 1, wherein the mixture is printed at a screen density of from 2 to 10% with a software-based print format, said format deriving a printed image from an algorithm stored on a software program.

4. The method of claim 1, wherein the mixture is printed with a continuous tone font with an image of from 300 to 1200 dots per inch at a screen density of from 15 to 23%.

5. The method of claim 1, wherein the resin-based carrier comprises a soya-based resin.

6. The method of claim 1, wherein the photocopier is a color photocopier.

* * * * *